(12) United States Patent
Peng et al.

(10) Patent No.: US 12,110,614 B1
(45) Date of Patent: Oct. 8, 2024

(54) CONTROL METHOD FOR YARN ROUTE INSPECTION EQUIPMENT, ELECTRONIC DEVICE AND STORAGE MEDIUM

(71) Applicant: ZHEJIANG HENGYI PETROCHEMICAL CO.,LTD., Zhejiang (CN)

(72) Inventors: Xiantao Peng, Zhejiang (CN); Peng Wang, Zhejiang (CN); Dake Li, Zhejiang (CN); Feng Xu, Zhejiang (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 0 days.

(21) Appl. No.: 18/674,877

(22) Filed: May 26, 2024

Related U.S. Application Data

(63) Continuation of application No. 18/392,352, filed on Dec. 21, 2023, now Pat. No. 11,993,868.

(30) Foreign Application Priority Data

Sep. 15, 2023  (CN) .......................... 202311188060.6

(51) Int. Cl.
*D01H 13/26* (2006.01)
*D01D 4/04* (2006.01)
*G06T 7/11* (2017.01)

(52) U.S. Cl.
CPC .............. *D01H 13/26* (2013.01); *G06T 7/11* (2017.01); *D01D 4/04* (2013.01); *G05B 2219/45191* (2013.01)

(58) Field of Classification Search
CPC .... D01H 13/005; D01H 13/26; D01H 15/013; G05B 2219/45191; G05B 2219/45196
(Continued)

(56) References Cited

U.S. PATENT DOCUMENTS 1,143,516 A 6/1915 Dunn
3,486,319 A 12/1969 Black et al.
(Continued)

FOREIGN PATENT DOCUMENTS

AU 2019101131 A4 10/2019
CN 106020204 A 10/2016
(Continued)

OTHER PUBLICATIONS

Extended European Search Report for Application No. EP 23218198 dated Jun. 6, 2024.
(Continued)

*Primary Examiner* — Grace Huang
(74) *Attorney, Agent, or Firm* — Meunier Carlin & Curfman LLC

(57) ABSTRACT

Provided is a control method for a yarn route inspection equipment, an electronic device and a storage medium. The method includes: detecting whether a first workstation in an initial yarn route inspection path is in a shoveling state; when the first workstation is not in the shoveling state, controlling the yarn route inspection equipment to inspect the first workstation; when the first workstation is in the shoveling state, controlling the yarn route inspection equipment to bypass the first workstation to inspect a second workstation and mark the first workstation as an uninspected state; and when inspection of the initial yarn route inspection path is completed and there is a workstation in the uninspected state, controlling the yarn route inspection equipment to perform supplementary inspection on the workstation in the uninspected state in the initial yarn route inspection path.

18 Claims, 11 Drawing Sheets

(58) Field of Classification Search
USPC .................................................. 700/139, 143
See application file for complete search history.

(56) References Cited

U.S. PATENT DOCUMENTS

| | | |
|---|---|---|
| 4,192,129 A | 3/1980 | Stahlecker |
| 4,194,349 A | 3/1980 | Lane |
| 4,592,198 A | 6/1986 | Stahlecker |
| 5,003,762 A | 4/1991 | Scaglia |
| 6,009,700 A | 1/2000 | Wassenhoven et al. |
| 6,381,511 B1 | 4/2002 | Hermanns et al. |
| 6,574,526 B1 | 6/2003 | Gaukler et al. |
| 6,772,697 B2 | 8/2004 | Stephan et al. |
| 7,010,383 B2 | 3/2006 | Zipperer |
| 7,113,843 B2 | 9/2006 | Bahlmann et al. |
| 9,631,299 B2 | 4/2017 | Maleck et al. |
| 9,792,692 B2 | 10/2017 | Costello |
| 10,552,986 B1 | 2/2020 | Arkhipau et al. |
| 10,558,844 B2 | 2/2020 | D'Ercoli et al. |
| 11,078,605 B2 | 8/2021 | Bahlmann et al. |
| 11,244,372 B2 | 2/2022 | Bhatt et al. |
| 11,410,315 B2 | 8/2022 | Homayounfar et al. |
| 11,417,001 B1 | 8/2022 | Bloch et al. |
| 11,810,256 B2 | 11/2023 | Wu et al. |
| 11,863,729 B2 | 1/2024 | Wu et al. |
| 2003/0070414 A1 | 4/2003 | Pohn et al. |
| 2005/0182509 A1 | 8/2005 | Brandl et al. |
| 2013/0231779 A1 | 9/2013 | Purkayastha et al. |
| 2017/0161887 A1 | 6/2017 | Thouy |
| 2020/0133254 A1 | 4/2020 | Cella et al. |
| 2021/0348306 A1 | 11/2021 | Marx |
| 2022/0066456 A1 | 3/2022 | Ebrahimi et al. |
| 2022/0257868 A1 | 8/2022 | Yan |
| 2022/0274257 A1 | 9/2022 | Kupcsik et al. |
| 2022/0301227 A1 | 9/2022 | Kanazawa |
| 2023/0145496 A1 | 5/2023 | Garces et al. |
| 2023/0228005 A1 | 7/2023 | Bahlmann |
| 2023/0353612 A1 | 11/2023 | Springer |

FOREIGN PATENT DOCUMENTS

| | | |
|---|---|---|
| CN | 107879190 A | 4/2018 |
| CN | 109489664 A | 3/2019 |
| CN | 109753074 A | 5/2019 |
| CN | 111058130 A | 4/2020 |
| CN | 111076726 A | 4/2020 |
| CN | 112418019 A | 2/2021 |
| CN | 113359761 A | 9/2021 |
| CN | 113638104 A | 11/2021 |
| CN | 113860078 A | 12/2021 |
| CN | 114445756 A | 5/2022 |
| CN | 114779727 A | 7/2022 |
| CN | 115291598 A | 11/2022 |
| CN | 115330006 A | 11/2022 |
| CN | 115816487 A | 3/2023 |
| CN | 115933685 A | 4/2023 |
| CN | 116894836 A | 10/2023 |
| WO | 2007012212 A1 | 2/2007 |

OTHER PUBLICATIONS

English translation of allowed claims in Chinese Application No. 202311188060.6.
First Office Action, received in connection with CN Application No. 202311188060.6, dated Oct. 30, 2023, 15 pages.
Notification to Grant Patent Right for Invention, received in connection with CN Application No. 202311188060.6, dated Nov. 26, 2023, 5 pages.
Sun Jianguo, "Digital Intelligent Radiotherapy," Shandong Science and Technology Publishing house, Dec. 2019, 3 pages.
Guoxin Li, et al., "Systematic Design of a 3-DOF Dual-Segment Continuum Robot for In Situ Maintenance in Nuclear Power Plants," Machines 2022, 10, 596, Jul. 21, 2022, 20 pages.

CONTROL METHOD FOR YARN ROUTE INSPECTION EQUIPMENT, ELECTRONIC DEVICE AND STORAGE MEDIUM

CROSS-REFERENCE TO RELATED APPLICATIONS

The present application is a continuation of U.S. patent application Ser. No. 18/392,352, filed on Dec. 21, 2023, which claims priority to Chinese Patent Application No. CN202311188060.6, filed with the China National Intellectual Property Administration on Sep. 15, 2023, the disclosures of which are hereby incorporated herein by reference in their entireties.

TECHNICAL FIELD

The present disclosure relates to a field of automatic control technology, and in particular to a control method and apparatus for a yarn route inspection equipment, a device and a storage medium.

BACKGROUND

In the spinning production process, since the form of presentation of the raw materials for spinning is mainly non-Newtonian fluid, the anomalies such as end breakage of yarn, floating yarn, hook yarn, tilt of oil nozzle, tilt of yarn guide hook, yarn being not in yarn guide hook, etc. may occur when the spinning box is operated for a long time. There is a need to inspect the spinning box and shovel the spinning box according to a certain period. At present, the inspection robots can only conduct inspections along fixed paths, the inspection speed is low, and many missed inspections may occur.

SUMMARY

The present disclosure provides a control method and apparatus for a yarn route inspection equipment, a device and a storage medium, to solve or alleviate one or more technical problems in the prior art.

In a first aspect, the present disclosure provides a control method for a yarn route inspection equipment, including:
  detecting whether a first workstation in an initial yarn route inspection path is in a shoveling state; where the initial yarn route inspection path includes a sequence of inspecting a plurality of workstations of one or more channels in a spinning workshop, and each of the plurality of workstations has a spinning box; where detecting whether the first workstation in the initial yarn route inspection path is in the shoveling state, includes: segmenting a workstation image into a plurality of segmented images by using an image processing model, and identifying a type of a target object in each segmented image, where one segmented image includes one target object in the spinning workshop; when a type of a target object in a first segmented image among the plurality of segmented images is a shovel working object and a type of a target object in a second segmented image is a workstation mark, determining a positional relationship between the shovel working object and the workstation mark; and determining whether the first workstation is in the shoveling state according to the positional relationship between the shovel working object and the workstation mark;
  when the first workstation is not in the shoveling state, controlling the yarn route inspection equipment to inspect the first workstation;
  when the first workstation is in the shoveling state, controlling the yarn route inspection equipment to bypass the first workstation to inspect a second workstation and mark the first workstation as an uninspected state, where the second workstation is a next inspectable workstation behind the first workstation in the initial yarn route inspection path; and
  when inspection of the initial yarn route inspection path is completed and there is a workstation in the uninspected state, controlling the yarn route inspection equipment to perform supplementary inspection on the workstation in the uninspected state in the initial yarn route inspection path.

In a second aspect, the present disclosure provides a control apparatus for a yarn route inspection equipment, including:
  a detection module configured to detect whether a first workstation in an initial yarn route inspection path is in a shoveling state; where the initial yarn route inspection path includes a sequence of inspecting a plurality of workstations of one or more channels in a spinning workshop, and each of the plurality of workstations has a spinning box; where the detection module is specifically configured to: segment a workstation image into a plurality of segmented images by using an image processing model, and identify a type of a target object in each segmented image, where one segmented image includes one target object in the spinning workshop; when a type of a target object in a first segmented image among the plurality of segmented images is a shovel working object and a type of a target object in a second segmented image is a workstation mark, determine a positional relationship between the shovel working object and the workstation mark; and determine whether the first workstation is in the shoveling state according to the positional relationship between the shovel working object and the workstation mark;
  a first inspection control module configured to: when the first workstation is not in the shoveling state, control the yarn route inspection equipment to inspect the first workstation; and when the first workstation is in the shoveling state, control the yarn route inspection equipment to bypass the first workstation to inspect a second workstation and mark the first workstation as an uninspected state, where the second workstation is a next inspectable workstation behind the first workstation in the initial yarn route inspection path; and
  a second inspection control module configured to: when inspection of the initial yarn route inspection path is completed and there is a workstation in the uninspected state, control the yarn route inspection equipment to perform supplementary inspection on the workstation in the uninspected state in the initial yarn route inspection path.

In a third aspect, provided is an electronic device, including:
  at least one processor; and
  a memory connected in communication with the at least one processor;
  where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

The technical solution provided in the present disclosure can control the yarn route inspection equipment to bypass the workstation in the shoveling state in the inspection process, and can also perform supplementary inspection on the workstation in the uninspected state, reducing workstations with inspection missed and improving the efficiency of yarn route inspection.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

Figure 1:
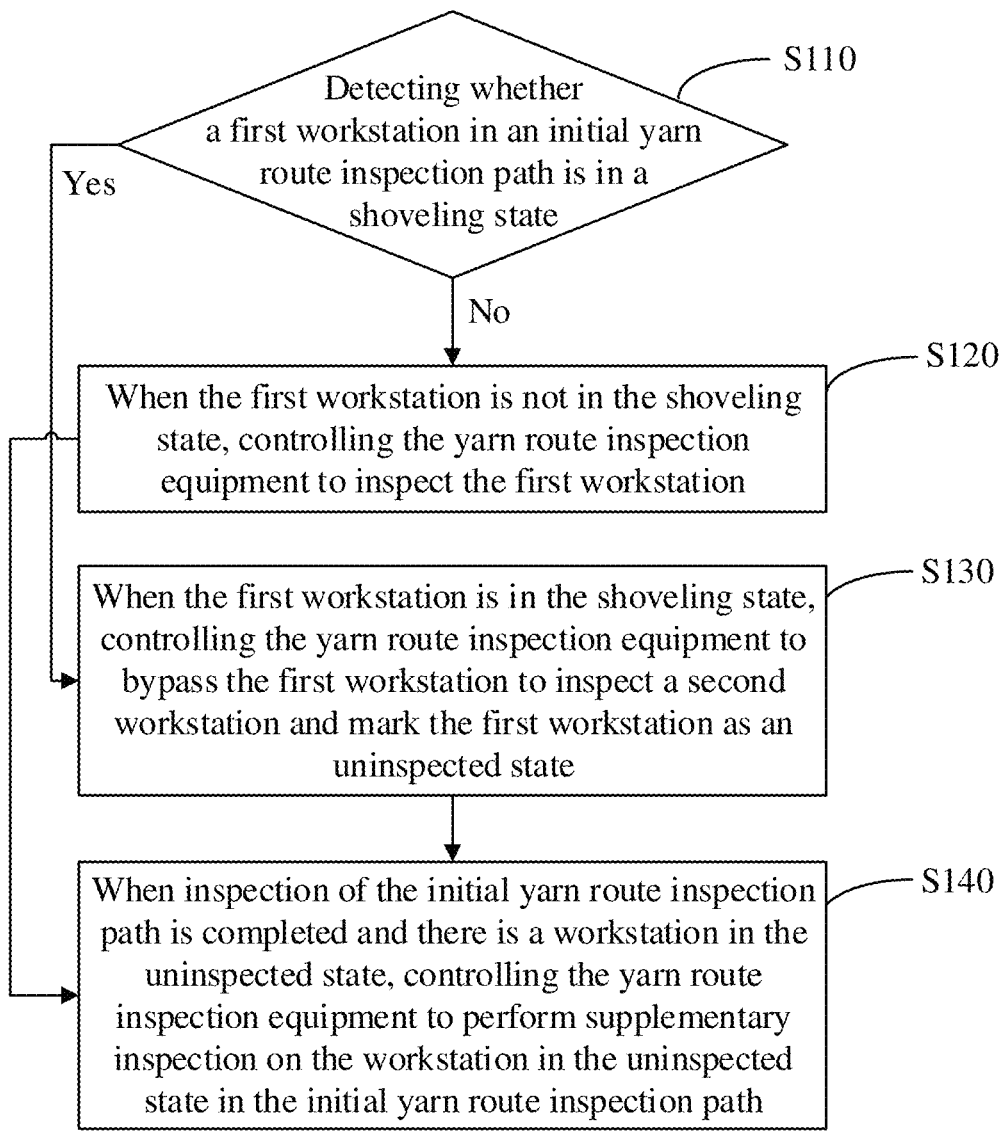
FIG. 1 is a schematic flow chart of a control method for a yarn route inspection equipment according to the embodiment of the present disclosure.

FIG. 1 is a schematic flow chart of a control method for a yarn route inspection equipment according to the embodiment of the present disclosure. This method includes at least a part of the following content.

S110: detecting whether a first workstation in an initial yarn route inspection path is in a shoveling state; where the initial yarn route inspection path includes a sequence of inspecting a plurality of workstations of one or more channels in a spinning workshop, and each of the plurality of workstations has a spinning box.

Here, the step of detecting whether the first workstation in the initial yarn route inspection path is in the shoveling state includes: segmenting a workstation image into a plurality of segmented images by using an image processing model, and identifying a type of a target object in each segmented image, where one segmented image includes one target object in the spinning workshop; when a type of a target object in a first segmented image among the plurality of segmented images is a shovel working object and a type of a target object in a second segmented image is a workstation mark, determining a positional relationship between the shovel working object and the workstation mark; and determining whether the first workstation is in the shoveling state according to the positional relationship between the shovel working object and the workstation mark.

S120: when the first workstation is not in the shoveling state, controlling the yarn route inspection equipment to inspect the first workstation.

S130: when the first workstation is in the shoveling state, controlling the yarn route inspection equipment to bypass the first workstation to inspect a second workstation and mark the first workstation as an uninspected state; where the second workstation is a next inspectable workstation behind the first workstation in the initial yarn route inspection path.

S140: when inspection of the initial yarn route inspection path is completed and there is a workstation in the uninspected state, controlling the yarn route inspection equipment to perform supplementary inspection on the workstation in the uninspected state in the initial yarn route inspection path.

In the embodiment of the present disclosure, a large number of spinning boxes are generally used to produce yarns in the spinning workshop. The polyester melt is ejected from the spinneret in the spinning box at a high speed, and the resulting yarn is oiled through the oil nozzle and then passes through the yarn guide hook to enter the winding process. The spinning box may have problems, for example, the yarn is not oiled, the yarn is not hooked, the end breakage of the yarn, floating yarn, hook yarn, wrong yarn, the yarn route is not straight, the yarn route has foreign objects, the oil nozzle is tilted, the yarn guide hook is tilted, the yarn is not in the yarn guide hook, etc. Therefore, the yarn route inspection equipment such as yarn route inspection robot can be used for inspection in the spinning workshop. For example, the yarn route inspection robot may be an Automated Guided Vehicle (AGV) for yarn route inspection. The yarn route inspection robot may detect whether there are problems in the spinning box and the specific types of problems through image recognition and other methods. Moreover, since the raw materials for spinning are usually in the form of non-Newtonian fluid, the spinneret plate in the spinning box needs to be shoveled every once in a while. However, it takes a certain amount of time to shovel, so the spinning box that is being shoveled cannot be inspected.

In the embodiment of the present disclosure, an image collection device such as a camera may be used to capture images of workstations in the spinning workshop. The image collection device may be arranged on the yarn route inspection equipment, or may be arranged at a fixed location in the spinning workshop. For example, a row of fisheye cameras is arranged at the top of the channel, and each fisheye camera may be responsible for taking pictures of one or more workstations. The image processing model of the embodiment of the present disclosure may include an image segmentation model and a target classification model. The image segmentation model may be a Segment Anything Model (SAM) or any other model that can perform the image segmentation task, where the SAM may recognize various input prompts and determine the content that needs to be segmented in an image. The content that needs to be segmented in a workstation image of the spinning workshop may include a spinning box, a shovel work object, a workstation mark and other target objects. The shovel work object may include a shovel equipment and/or a shovel personnel. The use of the image processing model such as SAM may segment out a segmented image including a target object from the workstation image more accurately. One segmented image may include one target object, and the target objects in different segmented images may be different. The target classification model may identify the type of the target object in the segmented image. The target classification model may be obtained by training based on the Convolutional Neural Network (CNN) or the like. The target classification model may be trained using training samples such as sample images of shovel equipments, sample images of shovel personnels and sample images of spinning boxes, so as to identify the target objects in the spinning workshop, such as shovel equipments, shovel personnels or spinning boxes, from the segmented images more accurately.

If one workstation image is segmented into a plurality of segmented images, the type of the target object in each segmented image may be identified. If one segmented image (the first segmented image) includes a shovel work object, and one or more segmented images (the second segmented image) include a workstation mark or workstation marks, the positional relationship between the shovel work object and one or more workstation marks may be compared. The comparison rule may be set according to positions of actual objects with workstation marks, for example, workstation signboards. For example, if a workstation signboard is arranged on the right edge of the spinning box and it is detected that the shovel work object in the workstation image is to the left of a workstation mark, then the workstation represented by the workstation mark is in the shoveling state. For another example, if a workstation signboard is arranged on the right edge of the spinning box and it is detected that the shovel work object in the workstation image is between two workstation marks, then it can be determined that the workstation represented by the workstation mark on the right side of the spinning box in the workstation image is in the shoveling state. In addition, if none of the segmented images includes the shovel work object, it can be determined that the workstation represented by the workstation mark in the workstation image is not in the shoveling state.

In one implementation, the target object that needs to be segmented in the workstation image of the spinning workshop may include a shovel indicator light of the spinning box. The shovel indicator light may include one or more of a shovel start indicator light, a shovel demand indicator light, and a normal working indicator light. The image processing model can be used to segment out a segmented image including the shovel indicator light from the workstation image, and identify the segmented image including the shovel indicator light to determine one or more of the color, type and state of the indicator light. Then, based on one or more of the color, type and state of the indicator light in a workstation image, it can be determined whether the workstation included in the workstation image is in the shoveling state. For example, if the shovel indicator light of a workstation is identified as a shovel start indicator light and the state of the indicator light is on and/or the color of the indicator light is red, it may indicate that the workstation is in the shoveling state; if the state of the indicator light is off, it may indicate that the workstation is not in the shoveling state. For another example, if the shovel indicator light of a workstation is identified as a shovel demand indicator light and the state of the indicator light is on and/or the color of the indicator light is green, it may indicate that the workstation requires shoveling. The workstation that requires shoveling may not be inspected. In this case, it can also be determined that the workstation is in the shoveling state. For another example, if the shovel indicator light of a workstation is identified as a normal working indicator light and the state of the indicator light is on, it can be determined that the workstation is not in the shoveling state.

In the embodiment of the present disclosure, the state of the workstation is determined based on the indicator light in the workstation image, and the state of the workstation is determined based on the shovel action object and/or the workstation mark in the workstation image. These two methods may be respectively implemented independently or may be implemented in combination. For example, when it is determined by both methods that a workstation is in the shoveling state, it is finally determined that the workstation is in the shoveling state.

In one implementation, the control method for the yarn route inspection equipment further includes: constructing an electronic map of the spinning workshop. Here, the step of constructing the electronic map of the spinning workshop may include: controlling the yarn route inspection equipment to collect the position data of each workstation in the spinning workshop in the process of traveling according to a set traversal path in the spinning workshop; and constructing the electronic map of the spinning workshop by using a map construction algorithm based on the position data of each workstation in the spinning workshop. Here, the electronic map of the spinning workshop includes a position tag corresponding to each workstation in the spinning workshop; and the initial yarn route inspection path includes a position tag corresponding to each workstation that needs to be inspected.

In the embodiment of the present disclosure, the traversal path in the spinning workshop may be the same as or similar to the initial yarn route inspection path. For example, the traversal path in the spinning workshop may include a round trip path from a starting point to an end point along various channels. The traversal path in the spinning workshop may also be different from the initial yarn route inspection path. For example, the traversal path includes a path that goes around the inner edge of the spinning workshop from the starting point and then returns to the starting point, and a round trip path from the starting point to the end point along various channels. In one example, the yarn route inspection equipment such as AGV may be controlled to travel back and forth along various channels from the starting point until it stops at the end point in the spinning workshop. In the driving process, the AGV can obtain the position data of channels, production lines, spinning boxes, workstations, etc. in the spinning workshop based on the landmark QR code, pre-embedded magnetic nail, Bluetooth, wireless LAN, ultrasonic, infrared, lidar, etc. The position data of a workstation may be the same as the position data of a spinning box on the workstation, or the position data of a workstation where a spinning box is located may be obtained by extending outward to a certain range based on the position data of the spinning box. Based on these position data, the map construction algorithm such as Simultaneous Localization and Mapping (SLAM) algorithm may be used to construct the electronic map of the spinning workshop, such as a three-dimensional electronic map. The electronic map of the spinning workshop may include the position areas of channels, production lines, spinning boxes, workstations, etc. in the spinning workshop, and the corresponding position labels may be set for the position areas of channels, production lines, spinning boxes, workstations, etc. For example, the position label of a workstation may include one or more of: the workstation number of the workstation, the identifier of the production line where the workstation is located, the identifier of the channel where the workstation is located, and other information.

In the embodiment of the present disclosure, the AGV may construct an electronic map by itself, or may send the collected position data to a server, and the server constructs an electronic map and then sends it to the AGV for use. When performing the initial yarn route inspection task, the AGV or server may generate the corresponding initial yarn route inspection path based on the spatial positions of channels, production lines, spinning boxes, etc. in the electronic map. The electronic map may have a certain update cycle, such as one week or one month.

In the embodiment of the present disclosure, the initial yarn route inspection task may include the initial yarn route inspection path. The position of each workstation in the initial yarn route inspection path may be determined based on the electronic map. The initial yarn route inspection path may include the inspection sequence of all spinning boxes in a certain area, and specifically, may include the arrangement sequence of position labels corresponding to the workstations where the spinning boxes are located. For example, the initial yarn route inspection path may include the inspection sequence of the spinning boxes at all workstations of all channels in the entire spinning workshop, that is, the arrangement sequence of position labels corresponding to the workstations where all spinning boxes of all channels in the spinning workshop are located. For another example, the initial yarn route inspection path may include the inspection sequence of the spinning boxes at all workstations of some channels in the spinning workshop, that is, the arrangement sequence of position labels corresponding to the workstations where all spinning boxes of some channels in the spinning workshop are located. In addition, if it is known that some spinning boxes are faulty or have no assigned work and do not require inspection, the information of these spinning boxes that do not require inspection may also be excluded from the initial yarn route inspection path.

In the embodiment of the present disclosure, a workstation may include a spinning box. If it is detected that the spinneret plate of the spinning box at the workstation is being shoveled manually or by a shoveling robot, it can be considered that this workstation is in the shoveling state. The device that detects the state of the workstation may be a yarn route inspection equipment or a server. For example, the yarn route inspection equipment may be equipped with an image collection component such as a camera. The image information (such as photos or videos) of a workstation may be collected through the image collection component. The yarn route inspection equipment may use the image processing model to perform image recognition on the image information to judge whether the workstation is being shoveled manually or by a shoveling robot. The yarn route inspection equipment may also send the image information to the server, and the server uses the image processing model to perform image recognition to judge whether the workstation is being shoveled manually or by a shoveling robot. Moreover, the image information of the workstation may also be collected through other device in the environment, for example, a camera on the channel or production line, and sent to the server. The server performs image recognition on the image information to judge whether the workstation is being shoveled manually or by a shoveling robot. If a workstation is not being shoveled manually or by a shoveling robot, the yarn route inspection equipment can control itself to inspect the workstation; or the server can control the yarn route inspection equipment to inspect the workstation, that is, control the yarn route inspection equipment to inspect various components (for example, spinneret plate, oil nozzle, yarn guide hook, etc.) in the spinning box at the workstation. The workstation in the embodiments of the present disclosure may be called position, spinning position, spinning box position, spinning workstation, spinning box workstation, etc.

Figure 2:
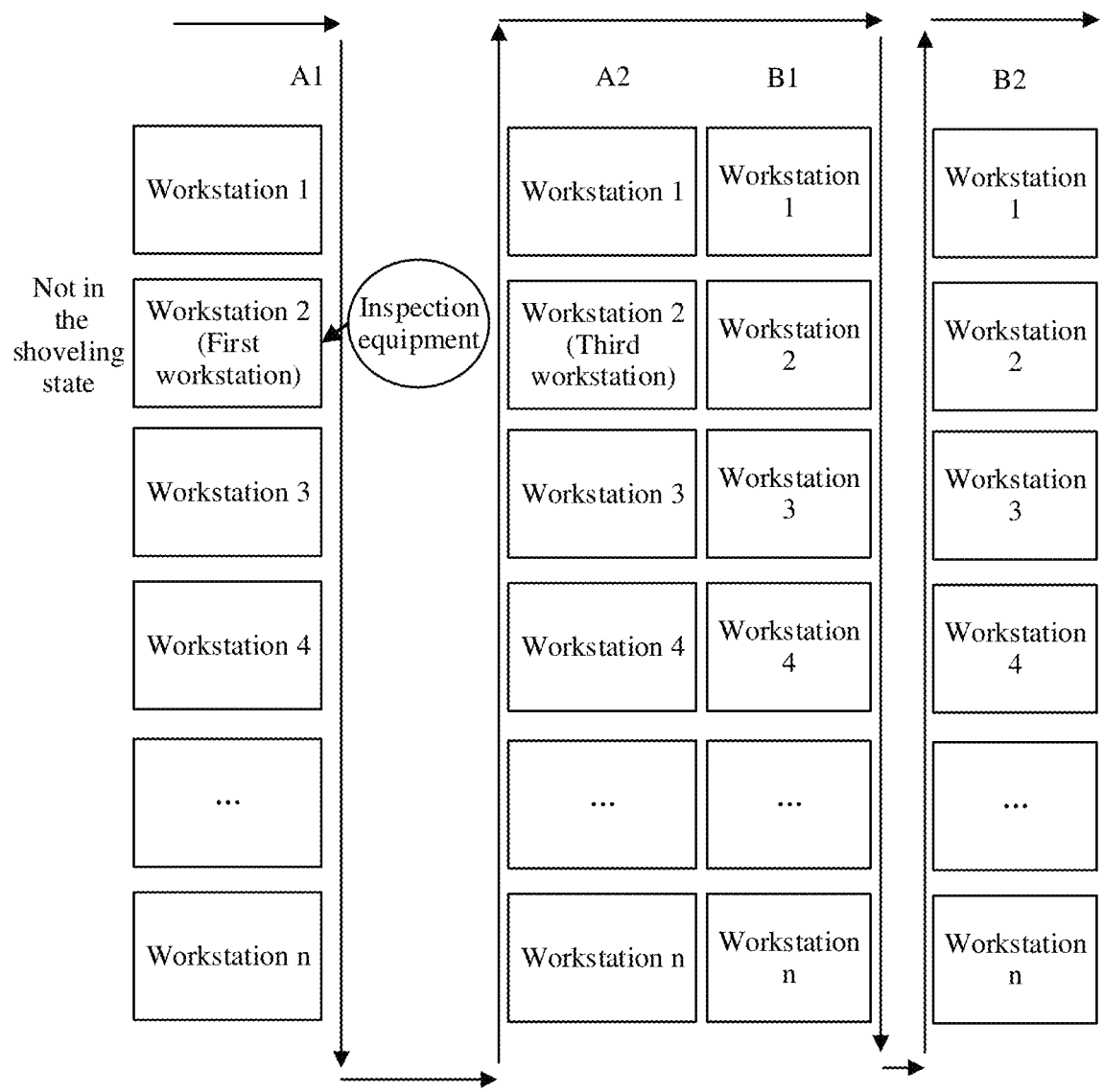
FIG. 2 is a schematic diagram of the initial yarn route inspection path according to the embodiment of the present disclosure.

As shown in FIG. 2, if the initial yarn route inspection path includes the inspection sequence of the spinning boxes at all workstations of 4 production lines in 2 channels, the S-shaped path as shown by the arrow is an example of the initial yarn route inspection path.

In the embodiment of the present disclosure, the initial yarn route inspection path may be generated in a yarn route inspection server, and then the initial yarn route inspection path is sent to the yarn route inspection equipment; or the initial yarn route inspection path may be generated or pre-configured in the yarn route inspection equipment. Further, the server or yarn route inspection equipment can judge whether the first workstation in the initial yarn route inspection path is in the shoveling state according to the initial inspection sequence. For example, the shovel state of the workstation can be stored in a table, and it is determined whether the parameter value corresponding to the shovel state of the first workstation represents the shoveling state by checking the table. For another example, it is possible to identify whether there are obstacles such as a shovel device (for example, a shoveling robot) at the first workstation by taking images or videos of the first workstation. The first workstation may include a workstation that has not been inspected or passed by the yarn route inspection equipment in the initial yarn route inspection path.

As shown in FIG. 2, the position label corresponding to the workstation 1 of the production line A1 can be represented as A1-1, the position label corresponding to the workstation 2 of the production line A1 can be represented as A1-2, and so on. The inspection sequence of workstations of the initial yarn route inspection path can include: A1-1, A1-2, A1-3, A1-4, . . . , A1-*n*, A2-*n*, . . . , A2-4, A2-3, A2-2, A2-1, B1-1, B1-2, B1-3, B1-4, . . . , B1-*n*, B2-*n*, . . . , B2-4, B2-3, B2-2, B2-1 (referring to the direction of the arrow). When the inspection starts, the first workstation may be the workstation 1 of the production line A1, and it may be judged whether the workstation 1 of the production line A1 is in the shoveling state. When the inspection of the workstation 1 of the production line A1 is completed, the first workstation may be a next workstation of the workstation 1 of the production line A1, that is, the workstation 2 of the production line A1, and it may be judged whether the workstation 2 of the production line A1 is in the shoveling state. By analogy, the first workstation may be the workstation where the inspection starts, or the workstation next to the workstation where the current inspection is completed. The repeated examples will be omitted.

Figure 3:
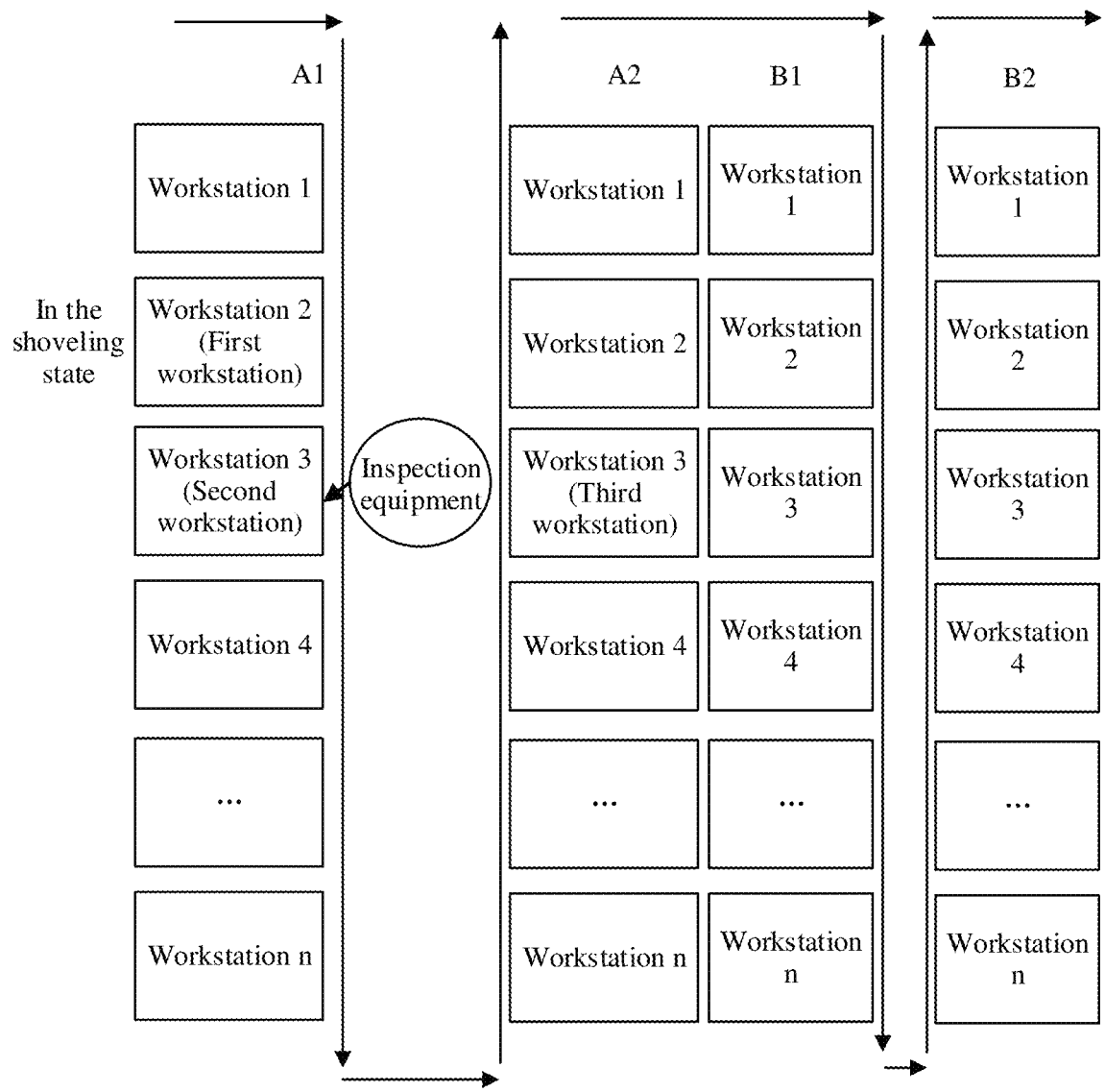
FIG. 3 is a schematic diagram of the workstation inspection state according to the embodiment of the present disclosure.

In the embodiment of the present disclosure, if the first workstation is not in the shoveling state, the yarn route inspection equipment can directly inspect the first workstation. After the inspection is completed, it is detected whether the next workstation of the first workstation in the initial yarn route inspection path can be inspected. If the first workstation is in the shoveling state, the yarn route inspection equipment can be controlled to bypass this workstation and continue to detect whether the next workstation of the first workstation in the initial yarn route inspection path can be inspected. If the next workstation of the first workstation is not in the shoveling state and there are no other abnormalities, it can be considered that the next workstation of the first workstation can be inspected, and then the yarn route inspection equipment is controlled to inspect the next workstation of the first workstation; otherwise, the yarn route inspection equipment continues to detect whether the following workstation can be inspected. For example, as shown in FIG. 2, if the workstation 2 of the production line A1 is not in the shoveling state, the yarn route inspection equipment can be controlled to directly inspect the workstation 2 of the production line A1. For example, as shown in FIG. 3, if the workstation 2 of the production line A1 is in the shoveling state, the workstation 3 of the production line A1 can be inspected, and then the yarn route inspection equipment can bypass the workstation 2 of the production line A1 from the workstation 1 of the production line A1, and inspect the workstation 3 of the production line A1.

Figure 4:
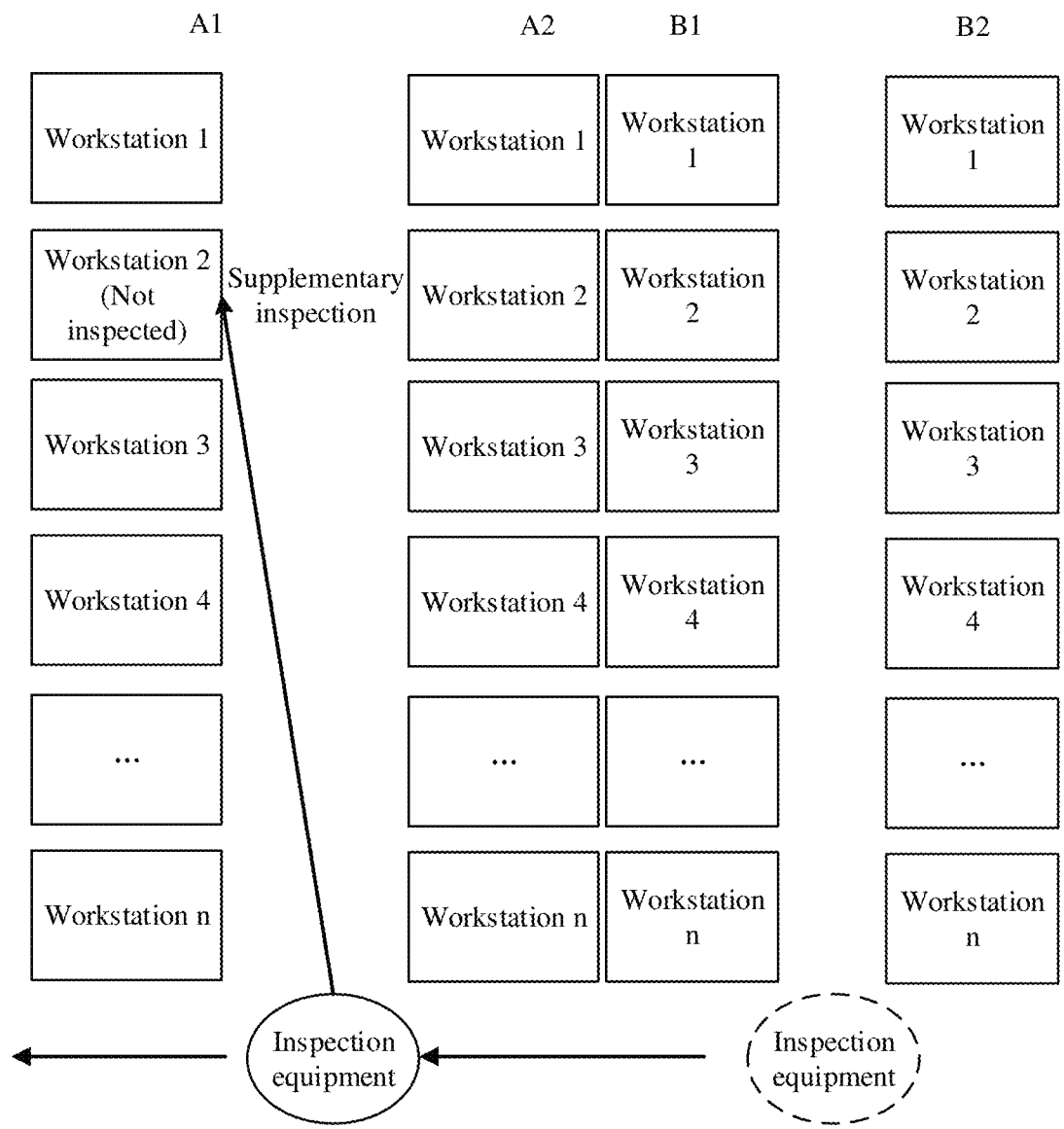
FIG. 4 is a schematic diagram of supplementary inspection according to the embodiment of the present disclosure.

In the embodiment of the present disclosure, after S120 or S130 is executed, the next workstation of the currently inspected workstation may be used as the first workstation, and S110 is re-executed. Here, S120 or S130 can be executed according to the state of the first workstation, and then the following workstations continue to be inspected. S110, S120, and S130 can be executed cyclically until the currently inspected first or second workstation is the last workstation in the initial yarn route inspection path, and then the inspection of the initial yarn route inspection path can be considered to be completed. In this case, S140 may be executed to control the yarn route inspection equipment to perform supplementary inspection on one or more workstations in the uninspected state in the initial yarn route inspection path. For example, as shown in FIG. 4, the workstation 2 of the production line A1 is in the uninspected state, and then the supplementary inspection can be performed on the workstation 2 of the production line A1. After the supplementary inspection is completed, the state of the workstation 2 of the production line A1 can be modified to the inspected state.

In the embodiment of the present disclosure, the second workstation may be a left-right adjacent workstation of the first workstation. When the first workstation is at the end point of the channel, the second workstation may also be the opposite workstation of the first workstation.

According to the embodiments of the present disclosure, the yarn route inspection equipment can be controlled to bypass the workstation being shoveled during the inspection process, without having to wait until the shoveling ends before inspection, thereby improving the efficiency of the yarn route inspection; and the supplementary inspection can also be performed on the workstations in the uninspected state (which can be referred to as uninspected workstations), reducing workstations with inspection missed, reducing the number of inspections, and further improving the inspection efficiency. Further, the control method for the yarn route inspection equipment according to the embodiments of the present disclosure can not only reduce the manual inspections and improve the work efficiency, but also can timely discover problems with the spinning box through efficient inspections, reduce the loss of devices and materials, and improve the production capacity.

Figure 5:
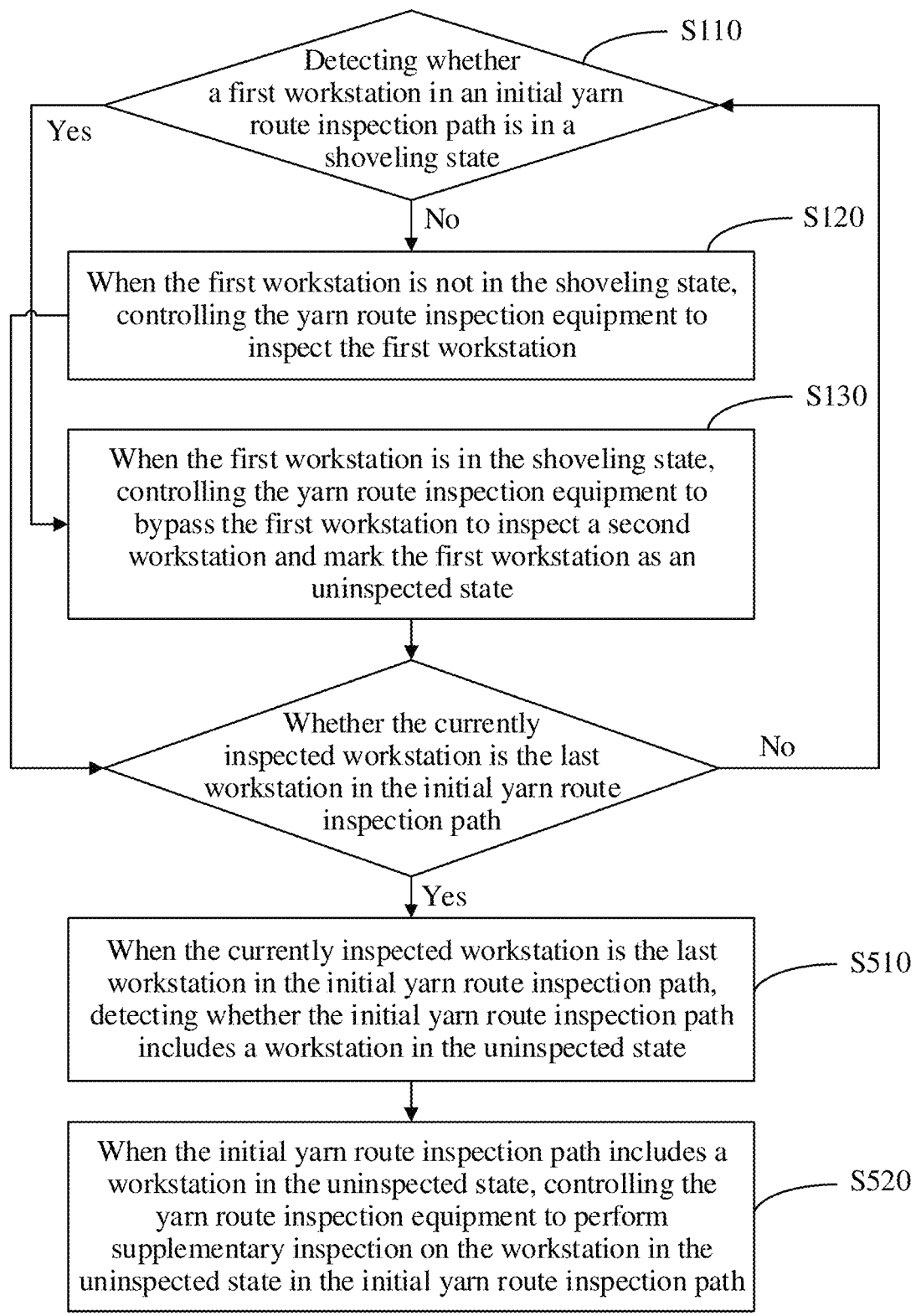
FIG. 5 is a schematic flow chart of a control method for a yarn route inspection equipment according to the embodiment of the present disclosure.

FIG. 5 is a schematic flow chart of a control method for a yarn route inspection equipment according to the embodiment of the present disclosure. This method may include one or more features of the above-mentioned method. In one implementation, the method may further include: when the currently inspected workstation is not the last workstation in the initial yarn route inspection path, returning to S110 of detecting whether a next workstation of the currently inspected workstation is in the shoveling state. In the embodiment of the present disclosure, after S120 or S130 is executed, it can be judged whether the currently inspected workstation is the last workstation in the initial yarn route inspection path. If the currently inspected workstation is not the last workstation, the workstation next to the currently inspected workstation can be used as the first workstation to execute S110 and start the next cycle.

In one implementation, S140 of the method may include:
S510: when the currently inspected workstation is the last workstation in the initial yarn route inspection path, detecting whether the initial yarn route inspection path includes a workstation in the uninspected state; and
S520: when the initial yarn route inspection path includes a workstation in the uninspected state, controlling the yarn route inspection equipment to perform supplementary inspection on the workstation in the uninspected state in the initial yarn route inspection path.

In one implementation, S520 may include at least one of:
(1) When there is a workstation in the uninspected state in a production line of a channel closest to the yarn route inspection equipment in a process of the yarn route inspection equipment to return to an origin and/or a charging point from the last workstation in the initial yarn route inspection path, controlling the yarn route inspection equipment to perform supplementary inspection on the workstation in the uninspected state in the production line.

In the embodiment of the present disclosure, after the yarn route inspection equipment such as the yarn route inspection robot completes the inspection of a workstation, it needs to judge whether this workstation is the last workstation in the initial yarn route inspection path. Specifically, whether the currently inspected workstation is the last workstation in the initial yarn route inspection path can be judged based on the path information included in the initial yarn route inspection path, image information recognition, etc. For example, if the yarn route inspection equipment at a currently inspected workstation judges that the currently inspected workstation is the last workstation in the initial yarn route inspection path, the yarn route inspection equipment can automatically return to the origin and/or charging point from the currently inspected workstation. For another example, if the server judges that the currently inspected workstation is the last workstation in the initial yarn route inspection path, the server can send a control signal to the yarn route inspection equipment, such as the yarn route inspection robot, to control the yarn route inspection equipment to return to the origin and/or charging point from the currently inspected workstation. In the process of returning to the origin and/or charging point, the yarn route inspection robot can execute S140 of performing supplementary inspection on the workstation in the uninspected state. It is also possible to execute S140 of performing supplementary inspection on the workstation in the uninspected state after the yarn route inspection robot returns to the origin and/or charging point.

In the embodiment of the present disclosure, the origin may include the starting point of the yarn route inspection equipment on the initial yarn route inspection path; the origin may also include the position where the yarn route inspection equipment starts to perform a yarn route inspection task that may include the task of inspecting the spinning boxes at all workstations in the above-mentioned initial yarn route inspection path; and the origin may also include the final return point of the yarn route inspection equipment set by the yarn route inspection system. The charging point may be an area where the yarn route inspection equipment is charged. The origin and charging point may be at the same location or at different locations. Controlling the yarn route inspection equipment to return to the origin and/or charging point is conducive to the unified management of the yarn route inspection equipment, timely replenishment of power, and improved workshop safety.

For example, one example of supplementary inspection is shown in FIG. 4. After the yarn route inspection equipment, such as an inspection robot, has inspected all workstations according to the initial yarn route inspection path, the yarn route inspection equipment may read the inspection state identifier of each workstation included in the production line of the channel it passes through in the process of returning to the origin and/or charging point. For example, the workstation 2 of the production line A1 is still in the uninspected state after a round of yarn route inspection, and then the yarn route inspection equipment may inspect the workstation 2 of the production line A1 according to the principle of the shortest straight line distance when moving to the production line A1 during the return process, and leave the production line A1 after completing the inspection. If there are a plurality of workstations that require supplementary inspection in a production line, it is possible to continue to the origin and/or charging point after the inspection of the workstations that require supplementary inspection in the production line is completed. During the progress of the yarn route inspection equipment, if it is found that there are also workstations that require supplementary inspection in other production lines, the supplementary inspection may be continued.

(2) Generating a supplementary inspection path based on the workstation in the uninspected state in the initial yarn route inspection path, and performing supplementary inspection on the workstation in the uninspected state in the initial yarn route inspection path based on the supplementary inspection path.

In the embodiment of the present disclosure, all workstations in the uninspected state that were missed in the initial yarn route inspection path can also be comprehensively counted, and then a supplementary inspection path is re-planned according to the shortest path principle based on the specific labels, positions and other information of these workstations in the uninspected state (uninspected workstations). For example, inspections are performed in order from near to far, starting from the uninspected workstation closest to the yarn route inspection equipment on a production line. If the supplementary inspection path is generated by the server, the server may send the supplementary inspection path to the original yarn route inspection equipment for supplementary inspection, or send the supplementary inspection path to a new yarn route inspection equipment for supplementary inspection.

In the embodiment of the present disclosure, after the supplementary inspection of the yarn route inspection is completed, the yarn route inspection equipment reports the inspection information to the yarn route inspection system. The inspection information includes at least one of: the state information of the spinning box at the workstation; the information on the length of time since the last shoveling operation of the spinning box; the operation report information of the spinning box to be shoveled; the information on the length of time of the shoveling operation of the spinning box being shoveled; the detailed image information of the spinneret plate, yarn guide hook, oil delivery nozzle and other components on the spinning box; the road information of each channel; and the environmental information of the factory.

Figure 6:
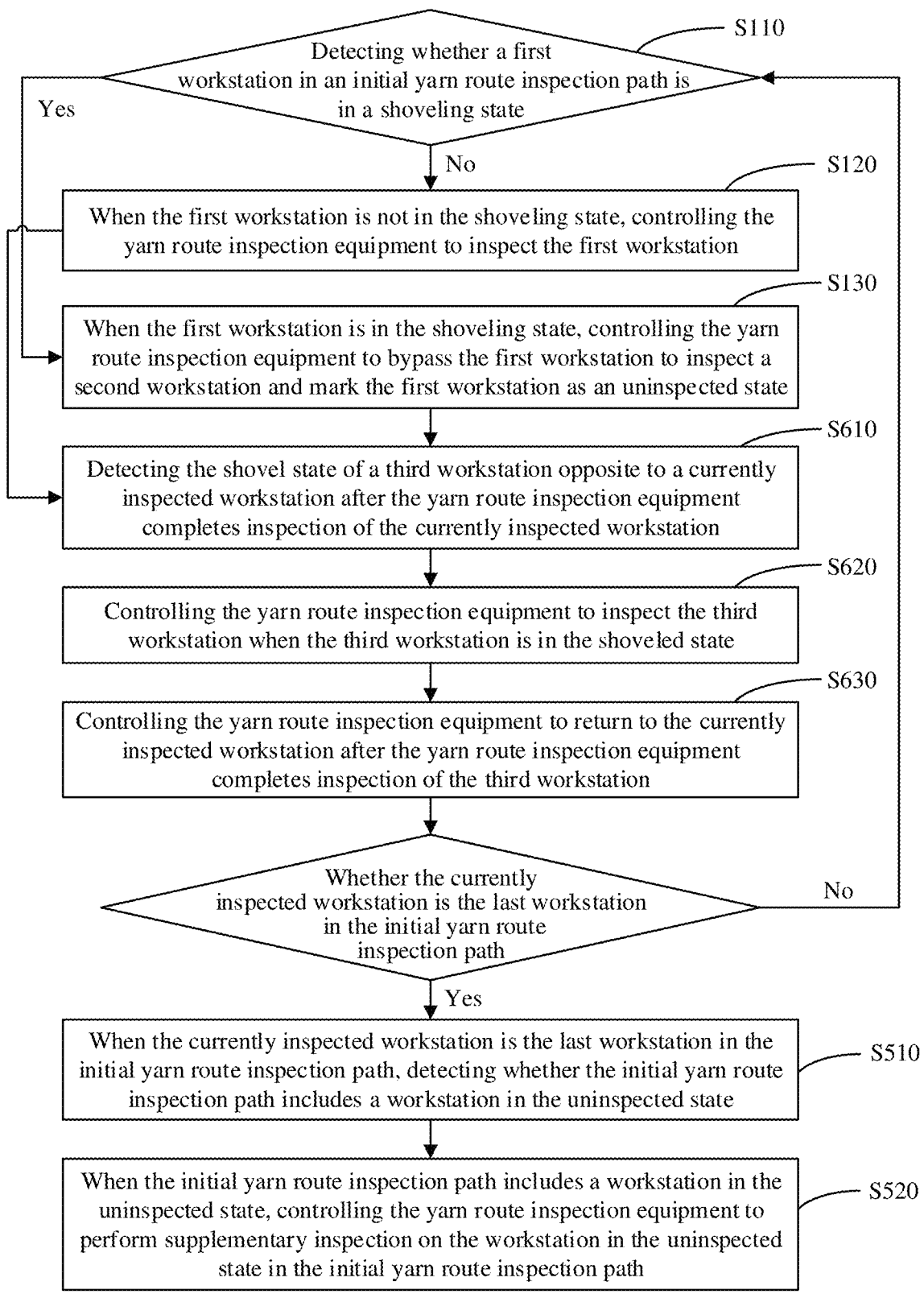
FIG. 6 is a schematic flow chart of a control method for a yarn route inspection equipment according to the embodiment of the present disclosure.

FIG. 6 is a schematic flow chart of a control method for a yarn route inspection equipment according to the embodiment of the present disclosure. This method may include one or more features of the above-mentioned method. In one implementation, the method may further include:

S610: detecting the shovel state of a third workstation opposite to a currently inspected workstation after the yarn route inspection equipment completes inspection of the currently inspected workstation. For example, the shovel state of the third workstation may include the shoveled state, the unshoveled state, the shoveling state, etc. The shovel state of the third workstation can be obtained through the shovel state identifier and other information in the table, or through image recognition or other means.

S620: controlling the yarn route inspection equipment to inspect the third workstation when the third workstation is in the shoveled state.

In the embodiment of the present disclosure, if one channel in the initial yarn route inspection path can include two production lines, one production line includes a plurality of workstations with spinning boxes. Relative to one workstation on one production line, a workstation on the other production line closest to that workstation is the opposite workstation. The currently inspected workstation may include the workstation inspected by the yarn route inspection equipment. After S120 is executed, the first workstation may be the currently inspected workstation. Referring to FIG. 2, the third workstation opposite to the first workstation may be the workstation 2 of the production line A2. After S130 is executed, the second workstation may be the currently inspected workstation. Referring to FIG. 3, the third workstation opposite to the second workstation may be the workstation 3 of the production line A2.

In the embodiment of the present disclosure, it may be determined whether to inspect the third workstation only according to the shovel state of the third workstation. For example, if the third workstation is in the shoveled state, it can mean that the third workstation has been shoveled but has ended the shoveled state, indicating that the third workstation may be a workstation that was missed due to shoveling. In this case, the third workstation can be directly inspected. After the inspection is completed, the third workstation can be marked as the inspected state. In this way, the supplementary inspection can be performed on the workstation that was not inspected due to being shoveled, thereby improving the inspection efficiency. For another example, if the third workstation is in the shoveling state, the third workstation cannot be inspected.

If the currently inspected workstation is not the last workstation in the initial yarn route inspection path, the next workstation of the currently inspected workstation can be used as the first workstation, and S110 is executed, that is, it is detected whether the next workstation of the currently inspected workstation is in the shoveling state, to continue to inspect the following workstation. If the currently inspected workstation is the last workstation in the initial yarn route inspection path, S510 and S520 can be executed.

In addition, S630 may not be executed. After S620, it may be directly judged whether the currently inspected workstation is the last workstation in the initial yarn route inspection path, and then S110 is executed or S510 and S520 are executed based on the judgment result.

In the embodiment of the present disclosure, whether to perform inspection on the third workstation can be determined based on the shovel state and inspection state of the third workstation. The inspection state of the third workstation may include the inspected state, the uninspected state, the state of waiting for inspection, etc. Here, the uninspected state may represent the state in which the yarn route inspection equipment has passed through but has not inspected due to shoveling or other reasons. The state of waiting for inspection may represent the state in which the yarn route inspection equipment has not yet passed through. It is possible to firstly judge the inspection state of the third workstation and then judge the shovel state of the third workstation; or it is possible to firstly judge the shovel state of the third workstation and then judge the inspection state of the third workstation. For example, if it is firstly judged that the third workstation is in the inspected state or the state of waiting for inspection, the subsequent judgment may not be made, and the third workstation may not be inspected either. If it is firstly judged that the third workstation is in the uninspected state, it is possible to continue to judge the shovel state of the third workstation, and perform corresponding processing based on the judgment result. For example, if it is detected that the third workstation in the uninspected state is in the shoveled state, it means that the third workstation may be a workstation that was missed due to shoveling, and the third workstation may be inspected. For another example, if the third workstation in the uninspected state is in the unshoveled state, it means that the third workstation may have missed inspection due to some other non-shoveling reasons, and then the third workstation may also be inspected, thereby making the inspection scope more comprehensive.

The above-mentioned shoveled state, shoveling state, uninspected state, inspected state, etc. can be distinguished by certain marks. For example, a represents the shoveled state, b represents the shoveling state, c represents the unshoveled state, d represents the uninspected state, and e represents the inspected state. For another example, 01 represents the shoveled state, 00 represents the shoveling state, Null represents the unshoveled state, 11 represents the uninspected state, and 10 represents the inspected state.

In some examples, the state information such as the initial state and state change of each workstation in the yarn route inspection path can be represented in a form such as a table. See Table 1 for an example.

TABLE 1

| Production Line | Workstation Number | Shovel State | Inspection State |
|---|---|---|---|
| A1 | 1 | 00 | 10 |
| A1 | 2 | 00 | 11 |
| A1 | 3 | 00 | 11 |

The state information of workstations in the yarn route inspection path can be saved in the yarn route inspection equipment such as the yarn route inspection robot or in the server of the yarn route inspection system. For example, the state information of workstations is transmitted by the yarn route inspection equipment to the server in real time, or uploaded uniformly to the server after the yarn route inspection equipment has inspected all workstations.

In the embodiment of the present disclosure, if the third workstation is in the shoveled state and in the uninspected state, the third workstation may be a workstation that has been shoveled before the initial yarn route inspection task starts (i.e., a workstation with inspection missed during the last inspection), or may be a workstation that was bypassed by the yarn route inspection equipment due to the ongoing shoveling operation during the initial yarn route inspection task.

In one implementation, S610 may include: detecting the shovel state of the third workstation opposite to the currently inspected workstation after the yarn route inspection equipment completes inspection of the currently inspected workstation and when the third workstation opposite to the currently inspected workstation is in an inspected production line in the initial yarn route inspection path.

In the embodiment of the present disclosure, it is possible to firstly determine the inspection state of the production line in the channel, and then determine whether to further judge the shovel state of the third workstation opposite to the currently inspected workstation based on the inspection state of the production line. Based on the inspection states of the production lines, the production lines may be divided into inspected production lines and uninspected production lines, where the inspected production lines may include production lines that the yarn route inspection equipment has passed through based on the initial yarn route inspection path. Not all workstations in the inspected production line may have been inspected, and may include workstations with inspection missed due to shoveling and other reasons in the above embodiment. If the production line opposite to the currently inspected workstation (that is, the production line where the third workstation is located) is an inspected production line, it is possible to continue to judge the state of the third workstation on the inspected production line. Otherwise, if the production line opposite to the currently inspected workstation is an uninspected production line, the yarn route inspection equipment will subsequently move to the production line opposite to the currently inspected workstation for inspection according to the initial yarn route inspection path. Therefore, after the inspection of the currently inspected workstation is completed, it is possible to not judge the state of the workstation on the production line opposite to the currently inspected workstation, thus reducing the number of times to judge the state of the opposite workstation, reducing the repeated inspections, and improving the inspection efficiency.

In the embodiment of the present disclosure, the inspection state of a production line may be determined by a variety of information, such as the inspection sequence, the serial number of the production line, the inspection state identifier, etc. For example, if one channel includes two production lines and the yarn route inspection equipment firstly inspects the first production line and then inspects the second production line, then the state of the opposite workstation may not be judged during the inspection of the first production line, and the state of the opposite workstation is then judged during the inspection of the second production line. For another example, one workshop includes N channels, one channel includes two production lines, and the odd-numbered production lines may be inspected firstly and then the even-numbered production lines may be inspected in one channel. Then, the states of workstations on the opposite even-numbered production lines may not be judged during the inspection of the odd-numbered production lines, and then the states of workstations on the opposite odd-numbered production lines are judged during the inspection of the even-numbered production lines, thus reducing the number of judgments, and improving the inspection efficiency. For another example, the inspection state identifier of the production line is 1, representing the inspected production line; the inspection state identifier of the production line is 0, representing the uninspected production line. One channel includes 2 production lines. During the inspection of the first production line, based on the inspection state identifier of the second production line being 0, it is determined that the second production line is a production line that has not yet been inspected, and there is no need to judge the state of the workstation of the second production line. After inspecting the first production line, the inspection state identifier corresponding to the first production line may be set to 1. During the inspection of the second production line, based on the inspection state identifier of the first production line being 1, it is determined that the first production line is a production line that has been inspected, so it is necessary to judge the state of the workstation of the first production line.

In one implementation, the method may further include:

S630: controlling the yarn route inspection equipment to return to the currently inspected workstation after the yarn route inspection equipment completes inspection of the third workstation.

In the embodiment of the present disclosure, after inspecting the third workstation, the yarn route inspection equipment needs to change the uninspected state of the third workstation to the inspected state, and then returns to the currently inspected workstation opposite to the third workstation, and detects whether the next workstation of the currently inspected workstation is in the shoveling state. The yarn route inspection equipment may also not return to the currently inspected workstation opposite to the third workstation, but detect whether the next workstation of the currently inspected workstation is in the shoveling state at the third workstation. If the next workstation of the currently inspected workstation is in the shoveling state, the next workstation is avoided to continue to the following workstation for judgment or inspection; if the next workstation of the currently inspected workstation is not in the shoveling state, the yarn route inspection equipment moves to the next workstation of the currently inspected workstation for inspection.

Figure 7:
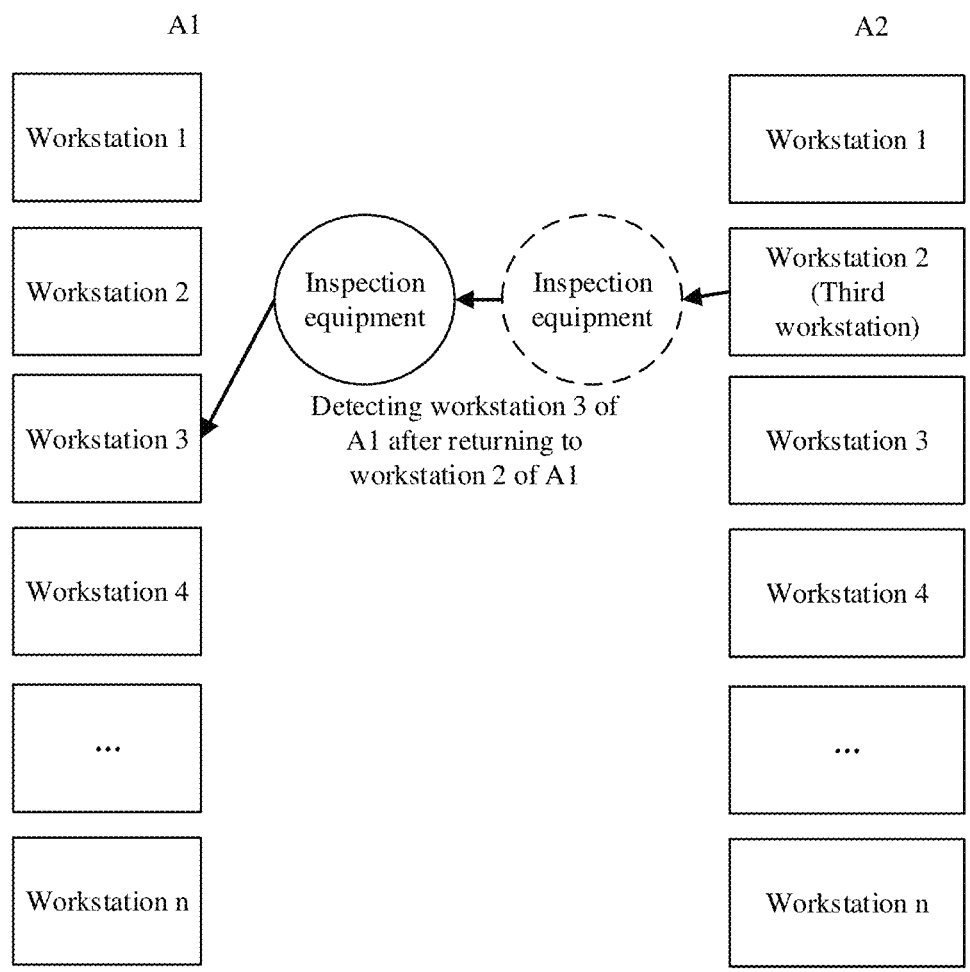
FIG. 7 is a schematic diagram of a judgment method for the shovel state according to the embodiment of the present disclosure.
Figure 8:
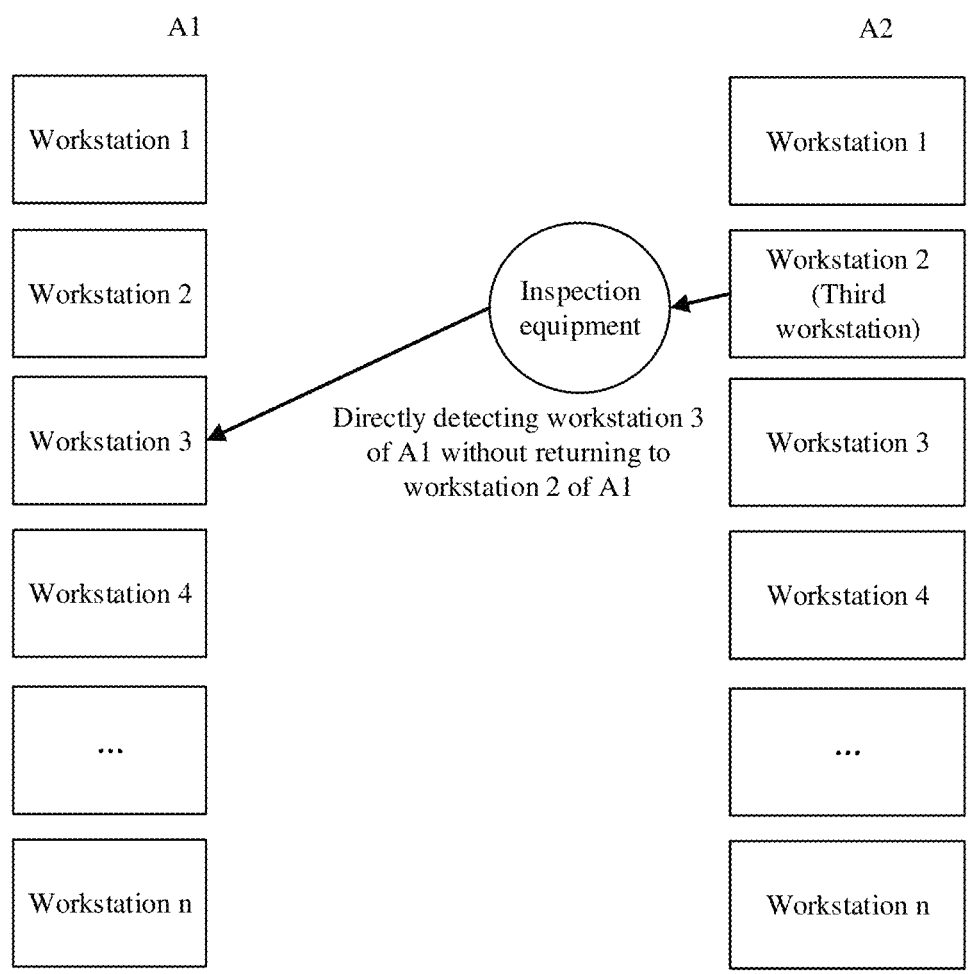
FIG. 8 is a schematic diagram of another judgment method for the shovel state according to the embodiment of the present disclosure.

For example, referring to FIG. 7, after inspecting the workstation 2 of the production line A2 (the third workstation), the yarn route inspection equipment returns to the workstation 2 of the production line A1 and detects the shovel state of the workstation 3 of the production line A1 to continue inspection. For another example, referring to FIG. 8, after inspecting the workstation 2 of the production line A2 (the third workstation), the yarn route inspection equipment does not return to the workstation 2 of the production line A1, and directly detects the shovel state of the workstation 3 of the production line A1 at the workstation 2 of the production line A2 (the third workstation).

In the embodiment of the present disclosure, after the yarn route inspection equipment, such as the yarn route inspection robot, completes the inspection of a certain workstation, the workstation may be marked as the inspected state or may be added with an inspected identifier. For example, the states of the workstations 2 and 3 of the production line A1 after the inspection is completed may be seen in Table 2.

TABLE 2

| Production Line | Workstation Number | Shovel State | Inspection State |
| --- | --- | --- | --- |
| A1 | 1 | 00 | 10 |
| A1 | 2 | 00 | 10 |
| A1 | 3 | 00 | 10 |

Figure 9:
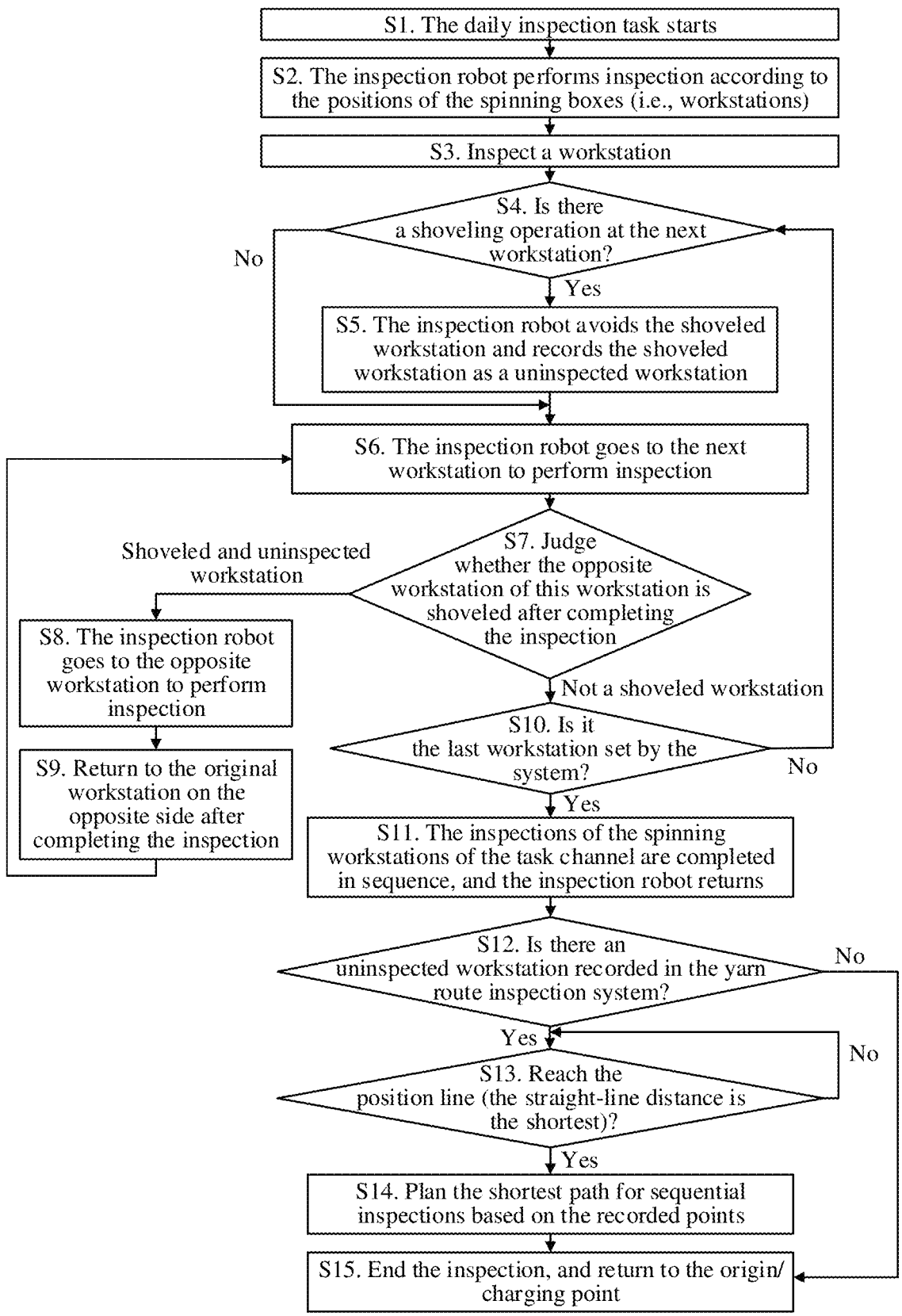
FIG. 9 is an example of a yarn route inspection process.

As shown in FIG. 9, an example of a yarn route inspection process may include:

S1. When the daily inspection task starts, the yarn route inspection system may issue the yarn route inspection task to a yarn route inspection equipment such as an inspection robot.

S2. The inspection robot performs inspection in sequence according to the positions of the spinning boxes (i.e., workstations).

S3. Inspect a certain workstation, such as workstation 1.

S4. Detect the shoveling operation state of the next workstation of this workstation. If the next workstation (such as workstation 2) of this workstation is in the shoveling state, step S5 is executed. Otherwise, if the next workstation of this workstation is not in the shoveling state, step S6 is executed.

S5. The inspection robot avoids the next workstation and records the avoided workstation (such as workstation 2) as a uninspected workstation (that is, a workstation in the uninspected state). After the recording is completed, step S6 is executed.

S6. The inspection robot goes to the next workstation to perform inspection. If S6 is executed after S5 is executed from step S4, the next workstation inspected in S6 is the next workstation of the workstation 2, that is, the workstation 3. If S6 is executed directly from step S4, the next workstation inspected in S6 is the next workstation of the workstation 1, that is, the workstation 2.

S7. Judge the shovel state of the opposite workstation of the currently inspected workstation, such as workstation 2 or 3, after completing the inspection. If the opposite workstation is a workstation that has been shoveled and has not been inspected, S8 is executed; otherwise, S10 is executed.

S8. The inspection robot goes to the opposite workstation to perform inspection.

S9. The inspection robot returns to the original workstation on the opposite side after completing the inspection, and executes S6.

S10. Judge whether the workstation where the inspection robot is located is the last workstation set by the system; if it is the last workstation set by the system, execute S11; if it is not the last workstation set by the system, return to S4 to continue to judge the shoveling operation state of the following workstation.

S11. The inspections of the spinning workstations of the task channel are completed in sequence, and the inspection robot returns.

S12. Judge whether there is an uninspected workstation recorded in the yarn route inspection system. If there is an uninspected workstation recorded in the yarn route inspection system, step S13 is executed. If there is no uninspected workstation recorded in the yarn route inspection system, step S15 is executed.

S13. Is the straight-line distance from the inspection robot to the line of the uninspected workstation (for example, the channel or production line including the uninspected workstation) the shortest? If so, step S14 is executed; otherwise, the inspection robot continues.

S14. Plan the shortest path for sequential inspections based on the recorded points (recorded uninspected workstations). After completing the inspection according to the plan, step S15 is executed. For example, if the inspection robot arrives at a channel and detects a plurality of uninspected workstations recorded in the channel, the shortest path can be planned based on the position distribution of these uninspected workstations in two production lines of the channel.

S15. The inspection ends and the inspection robot returns to the origin/charging point.

In one implementation, the architecture of the yarn route inspection system includes: a server, a Graphics Processing Unit (GPU), a handheld terminal (Personal Digital Assistant (PDA)), a Light Emitting Diode (LED) screen and a yarn route inspection equipment.

In the embodiment of the present disclosure, the yarn route inspection equipment, such as inspection robot, can use the obtaining modules such as camera, temperature sensor and delay sensor to obtain the inspection information of workstations in the spinning workshop. The information may be the detailed image information of the spinneret plate, yarn guide hook, oil nozzle and other components on the spinning box at a certain workstation; or may be the road information of each channel in the spinning workshop, such as the path image information of obstacles on the road, staff, other inspection robots, shovel devices, etc.; or may be the environmental information of the factory, such as temperature information, smoke information, and abnormal information of the distribution box. The yarn route inspection equipment collects such information and forwards it to the GPU in the yarn route inspection system for real-time operation. The GPU obtains the processing result of the real-time operation and then feeds the result back to the server of the yarn route inspection system for archiving.

In the embodiment of the present disclosure, the server in the yarn route inspection system compares the processing result of the real-time operation obtained by the GPU with the standard correct result for the spinning box in the system. When the difference between the processing result of the real-time operation obtained by the GPU and the standard correct result for the spinning box in the system is outside the allowable range, it can be considered that the processing result of the real-time operation obtained by the GPU is defective, and the server of the yarn route inspection system is required to send a notification to the handheld PDA, to notify the on-duty personnel of the day to conduct an on-site review and push the notification to the LED screen of the spinning workshop. At the same time, the inspection abnormality mark in the inspection marks is added to this workstation.

When there is no difference between the processing result of the real-time operation obtained by the GPU and the standard correct result for the spinning box in the system or the difference is within the allowable range, the processing result of the real-time operation obtained by the GPU is considered to be flawless. At this time, the server can notify the yarn route inspection equipment, such as inspection robot, to inspect the next workstation, and simultaneously add the inspected mark in the inspection marks to this workstation.

Figure 10:
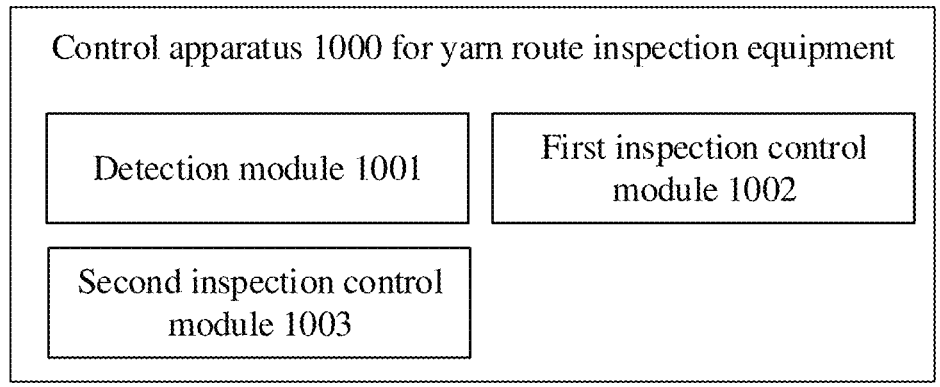
FIG. 10 is a schematic block diagram of a control apparatus for a yarn route inspection equipment according to the embodiment of the present disclosure.

FIG. 10 is a schematic block diagram of a control apparatus for a yarn route inspection equipment according to the embodiment of the present disclosure. The control apparatus 1000 for the yarn route inspection equipment may includes:

a detection module 1001 configured to detect whether a first workstation in an initial yarn route inspection path is in a shoveling state; where the initial yarn route inspection path includes a sequence of inspecting a plurality of workstations of one or more channels in a spinning workshop, and each of the plurality of workstations has a spinning box; where the detection module is specifically configured to: segment a workstation image into a plurality of segmented images by using an image processing model, and identify a type of a target object in each segmented image, where one segmented image includes one target object in the spinning workshop; when a type of a target object in a first segmented image among the plurality of segmented images is a shovel working object and a type of a target object in a second segmented image is a workstation mark, determine a positional relationship between the shovel working object and the workstation mark; and determine whether the first workstation is in the shoveling state according to the positional relationship between the shovel working object and the workstation mark;

a first inspection control module 1002 configured to: when the first workstation is not in the shoveling state, control the yarn route inspection equipment to inspect the first workstation; and when the first workstation is in the shoveling state, control the yarn route inspection equipment to bypass the first workstation to inspect a second workstation and mark the first workstation as an uninspected state, where the second workstation is a next inspectable workstation behind the first workstation in the initial yarn route inspection path; and a second inspection control module 1003 configured to: when inspection of the initial yarn route inspection path is completed and there is a workstation in the uninspected state, control the yarn route inspection equipment to perform supplementary inspection on the workstation in the uninspected state in the initial yarn route inspection path.

The control apparatus for the yarn route inspection equipment in the embodiment of the present disclosure may be arranged in a controller or processor of the yarn route inspection equipment such as an inspection robot, or may be arranged in a server.

In the embodiment, the detection module, the first inspection control module and the second inspection control module may be arranged in the same physical device, or may be arranged in different physical devices respectively. For example, the detection module, the first inspection control module and the second inspection control module are all arranged in the yarn route inspection equipment. For another example, the detection module, the first inspection control module and the second inspection control module are all arranged in the server. For another example, the detection module is arranged in the server, and the first inspection control module and the second inspection control module are arranged in the yarn route inspection equipment. The information may be exchanged between the server and the yarn route inspection equipment through wireless communication and other methods.

In one implementation, the second inspection control module 1003 is configured to: when a currently inspected workstation is a last workstation in the initial yarn route inspection path and the initial yarn route inspection path includes a workstation in the uninspected state, control the yarn route inspection equipment to perform supplementary inspection on the workstation in the uninspected state in the initial yarn route inspection path.

In one implementation, the second inspection control module 1003 is further configured to:

when there is a workstation in the uninspected state in a production line of a channel closest to the yarn route inspection equipment in a process of the yarn route inspection equipment to return to an origin and/or a charging point from the last workstation in the initial yarn route inspection path, control the yarn route inspection equipment to perform supplementary inspection on the workstation in the uninspected state in the production line; or generate a supplementary inspection path based on the workstation in the uninspected state in the initial yarn route inspection path, and control the yarn route inspection equipment to perform supplementary inspection on the workstation in the uninspected state in the initial yarn route inspection path based on the supplementary inspection path.

In one implementation, the detection module 1001 is further configured to: when a currently inspected workstation is not a last workstation in the initial yarn route inspection path, detect whether a next workstation of the currently inspected workstation is in the shoveling state.

Figure 11:
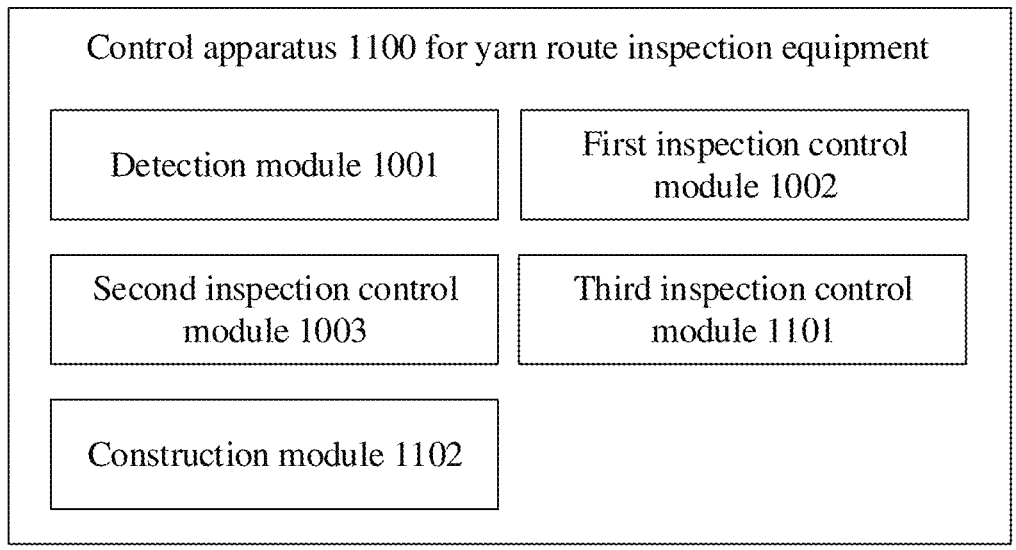
FIG. 11 is a schematic block diagram of a control apparatus for a yarn route inspection equipment according to the embodiment of the present disclosure.

FIG. 11 is a schematic block diagram of a control apparatus for a yarn route inspection equipment according to the embodiment of the present disclosure. The control apparatus 1100 for the yarn route inspection equipment may include one or more features of the control apparatus 1000 for the yarn route inspection equipment described above. In one implementation, the detection module 1001 is further configured to detect a shovel state of a third workstation opposite to a currently inspected workstation after the yarn route inspection equipment completes inspection of the currently inspected workstation.

In one implementation, the detection module 1001 is further configured to detect the shovel state of the third workstation opposite to the currently inspected workstation after the yarn route inspection equipment completes inspection of the currently inspected workstation and when the third workstation opposite to the currently inspected workstation is in an inspected production line in the initial yarn route inspection path.

In one implementation, the apparatus further includes:
a third inspection control module 1101 configured to control the yarn route inspection equipment to inspect the third workstation when the third workstation is in a shoveled state.

In one implementation, the third inspection control module 1101 is configured to control the yarn route inspection equipment to return to the currently inspected workstation after the yarn route inspection equipment completes inspection of the third workstation.

In one implementation, the apparatus further includes: a construction module 1102 configured to construct an electronic map of the spinning workshop; where the construction module is specifically configured to: control the yarn route inspection equipment to collect position data of each workstation in the spinning workshop in a process of traveling according to a set traversal path in the spinning workshop; and construct the electronic map of the spinning workshop by using a map construction algorithm based on the position data of each workstation in the spinning workshop; where the electronic map of the spinning workshop includes a position tag corresponding to each workstation in the spinning workshop; and the initial yarn route inspection path includes a position tag corresponding to each workstation that needs to be inspected.

For the description of specific functions and examples of the modules and sub-modules of the apparatus of the embodiment of the present disclosure, reference may be made to the relevant description of the corresponding steps in the above-mentioned method embodiment, and details are not repeated here.

Figure 12:
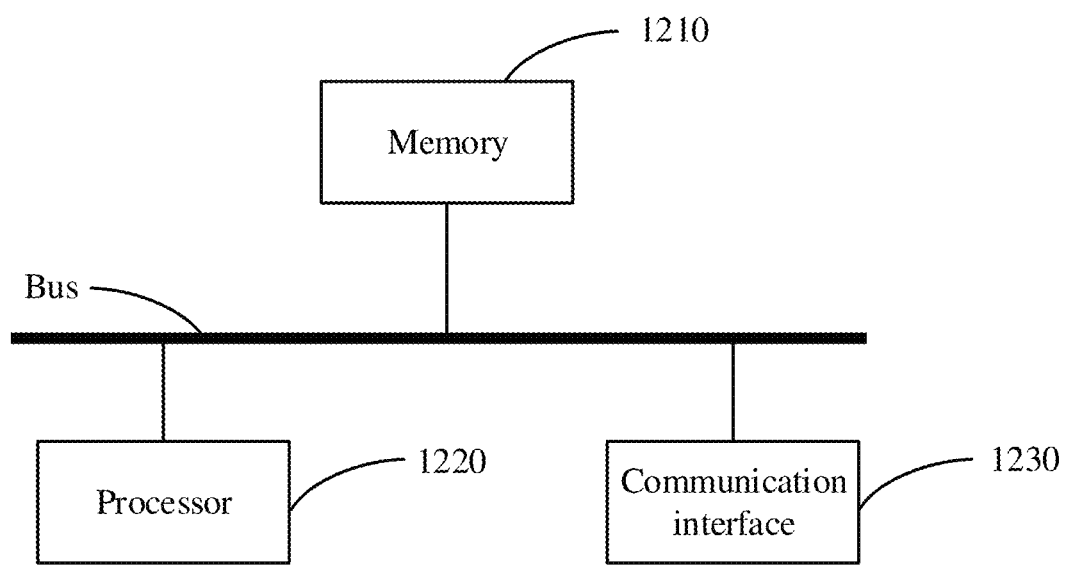
FIG. 12 is a structural block diagram of an electronic device according to the embodiment of the present disclosure.

FIG. 12 is a structural block diagram of an electronic device according to the embodiment of the present disclosure. As shown in FIG. 12, the electronic device includes: a memory 1210 and a processor 1220, and the memory 1210 stores a computer program that can run on the processor 1220. There may be one or more memories 1210 and processors 1220. The memory 1210 may store one or more computer programs, and the one or more computer programs cause the electronic device to perform the method provided in the above method embodiment, when executed by the electronic device. The electronic device may also include: a communication interface 1230 configured to communicate with an external device for data interactive transmission.

If the memory 1210, the processor 1220 and the communication interface 1230 are implemented independently, the memory 1210, the processor 1220 and the communication interface 1230 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the buses are represented by only one thick line in FIG. 12, but it does not represent only one bus or only one type of bus.

Optionally, in a specific implementation, if the memory 1210, the processor 1220 and the communication interface 1230 are integrated on one chip, the memory 1210, the processor 1220 and the communication interface 1230 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one implementation or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A control method for a yarn route inspection equipment, comprising:
    detecting whether a first workstation in an initial yarn route inspection path is in a shoveling state; wherein the initial yarn route inspection path comprises a sequence of inspecting a plurality of workstations of one or more channels in a spinning workshop, and each of the plurality of workstations has a spinning box; wherein the detecting of whether the first workstation in the initial yarn route inspection path is in the shoveling state, comprises: segmenting a workstation image into a plurality of segmented images by using an image processing model, and identifying a type of a target object in each segmented image, wherein each segmented image comprises one target object in the spinning workshop; in a case of a type of a target object in a first segmented image among the plurality of segmented images is a shovel working object and a type of a target object in a second segmented image is a workstation mark, determining a positional relationship between the shovel working object and the workstation mark; and determining whether the first workstation is in the shoveling state according to the positional relationship between the shovel working object and the workstation mark;
    in a case of the first workstation is not in the shoveling state, controlling the yarn route inspection equipment to inspect the first workstation;
    in a case of the first workstation is in the shoveling state, controlling the yarn route inspection equipment to bypass the first workstation to inspect a second workstation and mark the first workstation as an uninspected state, wherein the second workstation is a next inspectable workstation behind the first workstation in the initial yarn route inspection path;
    detecting a shoveling state of a third workstation opposite to a currently inspected workstation, in a case of the yarn route inspection equipment completes inspection of the currently inspected workstation and the third workstation opposite to the currently inspected workstation is in an inspected production line in the initial yarn route inspection path;

the controlling of the yarn route inspection equipment to or not to inspect the third workstation and detecting whether a next workstation of the currently inspected workstation is in the shoveling state, according to an inspected state of the third workstation and the shoveling state of the third workstation: in a case of the next workstation of the currently inspected workstation is in the shoveling state, avoiding the next workstation to continue to a following workstation for judgment or inspection: in a case of the next workstation of the currently inspected workstation is not in the shoveling state, controlling the yarn route inspection equipment to move to the next workstation of the currently inspected workstation for inspection; and in a case of inspection of the initial yarn route inspection path is completed and there is a workstation in the uninspected state, the controlling of the yarn route inspection equipment to perform supplementary inspection on the workstation in the uninspected state in the initial yarn route inspection path.

2. The method of claim 1, further comprising: constructing an electronic map of the spinning workshop; wherein the constructing of the electronic map of the spinning workshop comprises:

the controlling of the yarn route inspection equipment to collect position data of each workstation in the spinning workshop in a process of traveling according to a set traversal path in the spinning workshop; and using a map construction algorithm based on the position data of each workstation in the spinning workshop; wherein the electronic map of the spinning workshop comprises a position tag corresponding to each workstation in the spinning workshop; and the initial yarn route inspection path comprises a position tag corresponding to each workstation that needs to be inspected.

3. The method of claim 1, wherein, in the case of inspection of the initial yarn route inspection path is completed and there is the workstation in the uninspected state, the controlling of the yarn route inspection equipment to perform the supplementary inspection on the workstation in the uninspected state in the initial yarn route inspection path, comprises:

in a case of a currently inspected workstation is a last workstation in the initial yarn route inspection path and the initial yarn route inspection path comprises the workstation in the uninspected state, the controlling of the yarn route inspection equipment to perform the supplementary inspection on the workstation in the uninspected state in the initial yarn route inspection path.

4. The method of claim 3, wherein the controlling of the yarn route inspection equipment to perform the supplementary inspection on the workstation in the uninspected state in the initial yarn route inspection path, comprises:

in a case of there is the workstation in the uninspected state in a production line of a channel closest to the yarn route inspection equipment in a process of the yarn route inspection equipment to return to an origin and/or a charging point from the last workstation in the initial yarn route inspection path, the controlling of the yarn route inspection equipment to perform the supplementary inspection on the workstation in the uninspected state in the production line; or generating a supplementary inspection path based on the workstation in the uninspected state in the initial yarn route inspection path, and the controlling of the yarn route inspection equipment to perform the supplementary inspection on the workstation in the uninspected state in the initial yarn route inspection path based on the supplementary inspection path.

5. The method of claim 1, further comprising:

in a case of a currently inspected workstation is not a last workstation in the initial yarn route inspection path, detecting whether a next workstation of the currently inspected workstation is in the shoveling state.

6. The method of claim 1, further comprising:

the controlling of the yarn route inspection equipment to return to the currently inspected workstation after the yarn route inspection equipment completes the inspection of the third workstation.

7. An electronic device, comprising:

at least one processor; and a memory connected in communication with the at least one processor;

wherein the memory stores an instruction executable by the at least one processor, and the instruction, when executed by the at least one processor, enables the at least one processor to execute:

detecting whether a first workstation in an initial yarn route inspection path is in a shoveling state; wherein the initial yarn route inspection path comprises a sequence of inspecting a plurality of workstations of one or more channels in a spinning workshop, and each of the plurality of workstations has a spinning box; wherein the detecting of whether the first workstation in the initial yarn route inspection path is in the shoveling state, comprises: segmenting a workstation image into a plurality of segmented images by using an image processing model, and identifying a type of a target object in each segmented image, wherein each segmented image comprises one target object in the spinning workshop; in a case of a type of a target object in a first segmented image among the plurality of segmented images is a shovel working object and a type of a target object in a second segmented image is a workstation mark, determining a positional relationship between the shovel working object and the workstation mark; and determining whether the first workstation is in the shoveling state according to the positional relationship between the shovel working object and the workstation mark;

in a case of the first workstation is not in the shoveling state, controlling a yarn route inspection equipment to inspect the first workstation;

in a case of the first workstation is in the shoveling state, controlling the yarn route inspection equipment to bypass the first workstation to inspect a second workstation and mark the first workstation as an uninspected state, wherein the second workstation is a next inspectable workstation behind the first workstation in the initial yarn route inspection path;

detecting a shoveling state of a third workstation opposite to a currently inspected workstation, in a case of the yarn route inspection equipment completes inspection of the currently inspected workstation and the third workstation opposite to the currently inspected workstation is in an inspected production line in the initial yarn route inspection path;

the controlling of the yarn route inspection equipment to or not to inspect the third workstation and detecting whether a next workstation of the currently inspected workstation is in the shoveling state, according to an inspected state of the third workstation and the shoveling state of the third workstation; in a case of the next workstation of the currently inspected workstation is in the shoveling state, avoiding the next workstation to continue to a following workstation for judgment or inspection; in a case of the next workstation of the currently inspected workstation is not in the shoveling state, controlling the yarn route inspection equipment to move to the next workstation of the currently inspected workstation for inspection; and in a case of inspection of the initial yarn route inspection path is completed and there is a workstation in the uninspected state, the controlling of the yarn route inspection equipment to perform supplementary inspection on the workstation in the uninspected state in the initial yarn route inspection path.

8. The electronic device of claim 7, wherein the instruction, when executed by the at least one processor, enables the at least one processor to execute:

constructing an electronic map of the spinning workshop; wherein the constructing of the electronic map of the spinning workshop comprises:

the controlling of the yarn route inspection equipment to collect position data of each workstation in the spinning workshop in a process of traveling according to a set traversal path in the spinning workshop; and using a map construction algorithm based on the position data of each workstation in the spinning workshop; wherein the electronic map of the spinning workshop comprises a position tag corresponding to each workstation in the spinning workshop; and the initial yarn route inspection path comprises a position tag corresponding to each workstation that needs to be inspected.

9. The electronic device of claim 7, wherein the instruction, when executed by the at least one processor, enables the at least one processor to execute:

in a case of a currently inspected workstation is a last workstation in the initial yarn route inspection path and the initial yarn route inspection path comprises the workstation in the uninspected state, the controlling of the yarn route inspection equipment to perform the supplementary inspection on the workstation in the uninspected state in the initial yarn route inspection path.

10. The electronic device of claim 9, wherein the instruction, when executed by the at least one processor, enables the at least one processor to execute:

in a case of there is the workstation in the uninspected state in a production line of a channel closest to the yarn route inspection equipment in a process of the yarn route inspection equipment to return to an origin and/or a charging point from the last workstation in the initial yarn route inspection path, the controlling of the yarn route inspection equipment to perform the supplementary inspection on the workstation in the uninspected state in the production line; or generating a supplementary inspection path based on the workstation in the uninspected state in the initial yarn route inspection path, and the controlling of the yarn route inspection equipment to perform the supplementary inspection on the workstation in the uninspected state in the initial yarn route inspection path based on the supplementary inspection path.

11. The electronic device of claim 7, wherein the instruction, when executed by the at least one processor, enables the at least one processor to execute:

in a case of a currently inspected workstation is not a last workstation in the initial yarn route inspection path, detecting whether a next workstation of the currently inspected workstation is in the shoveling state.

12. The electronic device of claim 7, wherein the instruction, when executed by the at least one processor, enables the at least one processor to further execute:

the controlling of the yarn route inspection equipment to return to the currently inspected workstation after the yarn route inspection equipment completes the inspection of the third workstation.

13. A non-transitory computer-readable storage medium storing a computer instruction thereon, wherein the computer instruction is used to cause a computer to execute:

detecting whether a first workstation in an initial yarn route inspection path is in a shoveling state; wherein the initial yarn route inspection path comprises a sequence of inspecting a plurality of workstations of one or more channels in a spinning workshop, and each of the plurality of workstations has a spinning box; wherein the detecting of whether the first workstation in the initial yarn route inspection path is in the shoveling state, comprises: segmenting a workstation image into a plurality of segmented images by using an image processing model, and identifying a type of a target object in each segmented image, wherein each segmented image comprises one target object in the spinning workshop; in a case of a type of a target object in a first segmented image among the plurality of segmented images is a shovel working object and a type of a target object in a second segmented image is a workstation mark, determining a positional relationship between the shovel working object and the workstation mark; and determining whether the first workstation is in the shoveling state according to the positional relationship between the shovel working object and the workstation mark;

in a case of the first workstation is not in the shoveling state, controlling a yarn route inspection equipment to inspect the first workstation;

in a case of the first workstation is in the shoveling state, controlling the yarn route inspection equipment to bypass the first workstation to inspect a second workstation and mark the first workstation as an uninspected state, wherein the second workstation is a next inspectable workstation behind the first workstation in the initial yarn route inspection path;

detecting a shoveling state of a third workstation opposite to a currently inspected workstation, in a case of the yarn route inspection equipment completes inspection of the currently inspected workstation and the third workstation opposite to the currently inspected workstation is in an inspected production line in the initial yarn route inspection path;

the controlling of the yarn route inspection equipment to or not to inspect the third workstation and detecting whether a next workstation of the currently inspected workstation is in the shoveling state, according to an inspected state of the third workstation and the shoveling state of the third workstation; in a case of the next workstation of the currently inspected workstation is in the shoveling state, avoiding the next workstation to continue to a following workstation for judgment or inspection: in a case of the next workstation of the currently inspected workstation is not in the shoveling state, controlling the yarn route inspection equipment to move to the next workstation of the currently inspected workstation for inspection; and in a case of inspection of the initial yarn route inspection path is completed and there is a workstation in the uninspected state, the controlling of the yarn route inspection equipment to perform supplementary inspection on the workstation in the uninspected state in the initial yarn route inspection path.

14. The storage medium of claim 13, wherein the computer instruction is used to cause the computer to execute:

constructing an electronic map of the spinning workshop; wherein the constructing of the electronic map of the spinning workshop comprises:

the controlling of the yarn route inspection equipment to collect position data of each workstation in the spinning workshop in a process of traveling according to a set traversal path in the spinning workshop; and using a map construction algorithm based on the position data of each workstation in the spinning workshop; wherein the electronic map of the spinning workshop comprises a position tag corresponding to each workstation in the spinning workshop; and the initial yarn route inspection path comprises a position tag corresponding to each workstation that needs to be inspected.

15. The storage medium of claim 13, wherein the computer instruction is used to cause the computer to execute:

in a case of a currently inspected workstation is a last workstation in the initial yarn route inspection path and the initial yarn route inspection path comprises the workstation in the uninspected state, the controlling of the yarn route inspection equipment to perform the supplementary inspection on the workstation in the uninspected state in the initial yarn route inspection path.

16. The storage medium of claim 15, wherein the computer instruction is used to cause the computer to execute:

in a case of there is the workstation in the uninspected state in a production line of a channel closest to the yarn route inspection equipment in a process of the yarn route inspection equipment to return to an origin and/or a charging point from the last workstation in the initial yarn route inspection path, the controlling of the yarn route inspection equipment to perform the supplementary inspection on the workstation in the uninspected state in the production line; or generating a supplementary inspection path based on the workstation in the uninspected state in the initial yarn route inspection path, and the controlling of the yarn route inspection equipment to perform the supplementary inspection on the workstation in the uninspected state in the initial yarn route inspection path based on the supplementary inspection path.

17. The storage medium of claim 13, wherein the computer instruction is used to cause the computer to execute:

in a case of a currently inspected workstation is not a last workstation in the initial yarn route inspection path, detecting whether a next workstation of the currently inspected workstation is in the shoveling state.

18. The storage medium of claim 13, wherein the computer instruction is used to cause the computer to further execute:

the controlling of the yarn route inspection equipment to return to the currently inspected workstation after the yarn route inspection equipment completes the inspection of the third workstation.

* * * * *